United States Patent
Lessmann et al.

(10) Patent No.: US 11,050,673 B2
(45) Date of Patent: Jun. 29, 2021

(54) TIME-GUARDED FLOW RULE INSTALLATION

(71) Applicant: NEC Laboratories Europe GmbH, Heidelberg (DE)

(72) Inventors: Johannes Lessmann, Gummersbach (DE); Roberto Bifulco, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 430 days.

(21) Appl. No.: 15/999,256

(22) PCT Filed: Feb. 18, 2016

(86) PCT No.: PCT/EP2016/053444
§ 371 (c)(1),
(2) Date: Sep. 19, 2018

(87) PCT Pub. No.: WO2017/140363
PCT Pub. Date: Aug. 24, 2017

(65) Prior Publication Data
US 2020/0336431 A1    Oct. 22, 2020

(51) Int. Cl.
*H04L 12/841* (2013.01)
*H04L 12/721* (2013.01)
(Continued)

(52) U.S. Cl.
CPC ............ *H04L 47/28* (2013.01); *H04L 45/38* (2013.01); *H04L 45/54* (2013.01); *H04L 45/64* (2013.01)

(58) Field of Classification Search
None
See application file for complete search history.

(56) References Cited

U.S. PATENT DOCUMENTS

2014/0328350 A1\* 11/2014 Hao .................. H04L 47/80
370/401
2015/0372942 A1 12/2015 Kopetz
(Continued)

FOREIGN PATENT DOCUMENTS

| JP | 2011101245 A | 5/2011 |
| JP | 2015017014 A | 1/2015 |
| JP | 2015524217 A | 8/2015 |

OTHER PUBLICATIONS

Bull Peter et al: "Pre-emptive Flow Installation for Internet of Things Devices within Software Defined Networks", 2015 3$^{rd}$ International Conference on Future Internet of Things and Cloud, IEEE, Aug. 24, 2015 (Aug. 24, 2015), pp. 124-130, XP032798325.
(Continued)

*Primary Examiner* — Otis L Thompson, Jr.
(74) *Attorney, Agent, or Firm* — Leydig, Voit & Mayer, Ltd.

(57) ABSTRACT

A method for flow rule installation in a flow-based programmable network device, includes obtaining packet flow information that includes information about times and intervals of packet flow transmissions from data transmitting devices, programming, by a controller entity, forwarding rules into a flow table based on the packet flow information, and triggering activation of a forwarding rule programmed for a particular packet flow just-in-time before actual transmission of the particular packet flow. The flow-based programmable network device comprises input/output ports, a flow table including forwarding rules that map packet flows from data transmitting devices in the network, received on an input port, to an output port based on a packet flow matching a rule in the forwarding rules, and a state table including state entries that specify states of the packet flows.

17 Claims, 5 Drawing Sheets

(51) Int. Cl.
H04L 12/741 (2013.01)
H04L 12/715 (2013.01)

(56) References Cited

U.S. PATENT DOCUMENTS

| | | | | |
|---|---|---|---|---|
| 2016/0036838 A1* | 2/2016 | Jain | ............... | H04L 63/1416 |
| | | | | 726/23 |
| 2016/0315880 A1* | 10/2016 | Guo | ............... | H04L 45/70 |
| 2017/0272367 A1* | 9/2017 | Kozat | ............... | H04L 47/24 |
| 2020/0348973 A1* | 11/2020 | Kutch | ............... | H04L 47/76 |

OTHER PUBLICATIONS

Masoud Moshref et al: "Flow-level state transition as a new switch primitive for SDN", Hot Topics in Software Defined Networking, ACM, Aug. 22, 2014 (Aug. 22, 2014), pp. 61-66, XP058053574.
"OpenFlow Switch Specification version 1.5.0", Dec. 19, 2014 (Dec. 19, 2014), XP055272239.

* cited by examiner

TIME-GUARDED FLOW RULE INSTALLATION

CROSS REFERENCE TO RELATED APPLICATIONS

This application is a U.S. National Stage Application under 35 U.S.C. § 371 of International Application No. PCT/EP2016/053444 filed on Feb. 18, 2016. The International Application was published in English on Aug. 24, 2017 as WO 2017/140363 A1 under PCT Article 21(2).

FIELD

The present invention generally relates to a method and a system for flow rule installation in a flow-based programmable network device.

BACKGROUND

In so called "Smart Cities" and comparable scenarios, a huge number of sensors, e.g. smart meters, are connected to a network infrastructure. Many of these sensors may send data only very infrequently, e.g. once per hour or even once per day, to some sink such as an IoT (Internet of Things) database or server. Sensors either proactively push this data to the centralized IoT server or the latter polls the sensor—either in fixed intervals or on demand.

If permanent flow rules were to be installed for every sensor in the network, this would quickly overload the flow tables of the network's switches, especially those located closer to the IoT servers. While for the uplink direction (i.e. from the sensors to the servers), aggregate forwarding based on destination IP address would alleviate much of this problem, the issue cannot be avoided in the downlink direction which requires more granular flow rules.

Now it is certainly possible to use reactive flow rule installation in the flow-based programmable network devices (e.g. SDN switches) of the network infrastructure that carry data packets from the sensors to the IoT servers or to any other sink. With this, a sensor (or its IoT gateway) would send its data packet to the ingress switch, which—assuming an SDN network and in the absence of any matching rule—would consult an SDN controller and thus get a flow rule on demand. This rule could have an associated timeout value, so would disappear after a while. This method alleviates the flow rule overload problem as it distributes flow rule entries over time (provided sensors do not send all at the same time, which seems like a reasonable assumption in a heterogeneous system such as a Smart City network). However, it comes at the expense of high signaling load between switches and SDN controller. Millions of sensors will generate millions of message exchanges along the forwarding path in regular intervals. This may be considered a problem in itself.

An alternative solution would be the implementation of flow tables "expansions" (as described, for instance, in Roberto Bifulco and Anton Matsiuk: "Towards Scalable SDN Switches: Enabling Faster Flow Table Entries Installation", in *Proceedings of the* 2015 *ACM Conference on Special Interest Group on Data Communication* (SIGCOMM '15). ACM, New York, N.Y., USA, 343-344, DOI=http://dx.doi.org/10.1145/2785956.2790008, or in Naga Katta, Omid Alipourfard, Jennifer Rexford, and David Walker: "Infinite CacheFlow in software-defined networks", in *Proceedings of the third workshop on Hot topics in software defined networking* (HotSDN '14). ACM, New York, N.Y., USA, 175-180, DOI=http://dx.doi.org/10.1145/2620728.2620734). For example, one could use the switch's CPU to implement software flow tables, which can hold large numbers of entries, however, at the cost of limited forwarding throughput and limited scalability in respect to the data plane traffic handling.

SUMMARY

In an embodiment, the present invention provides a method for flow rule installation in a flow-based programmable network device, wherein the flow-based programmable network device comprises input/output ports, a flow table including forwarding rules that map packet flows from data transmitting devices in the network, received on an input port, to an output port based on a packet flow matching a rule in the forwarding rules, and a state table including state entries that specify states of the packet flows. The method includes obtaining packet flow information that includes information about times and intervals of packet flow transmissions from the data transmitting devices, programming, by a controller entity, forwarding rules into the flow table based on the packet flow information, and triggering activation of a forwarding rule programmed for a particular packet flow just-in-time before actual transmission of the particular packet flow.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
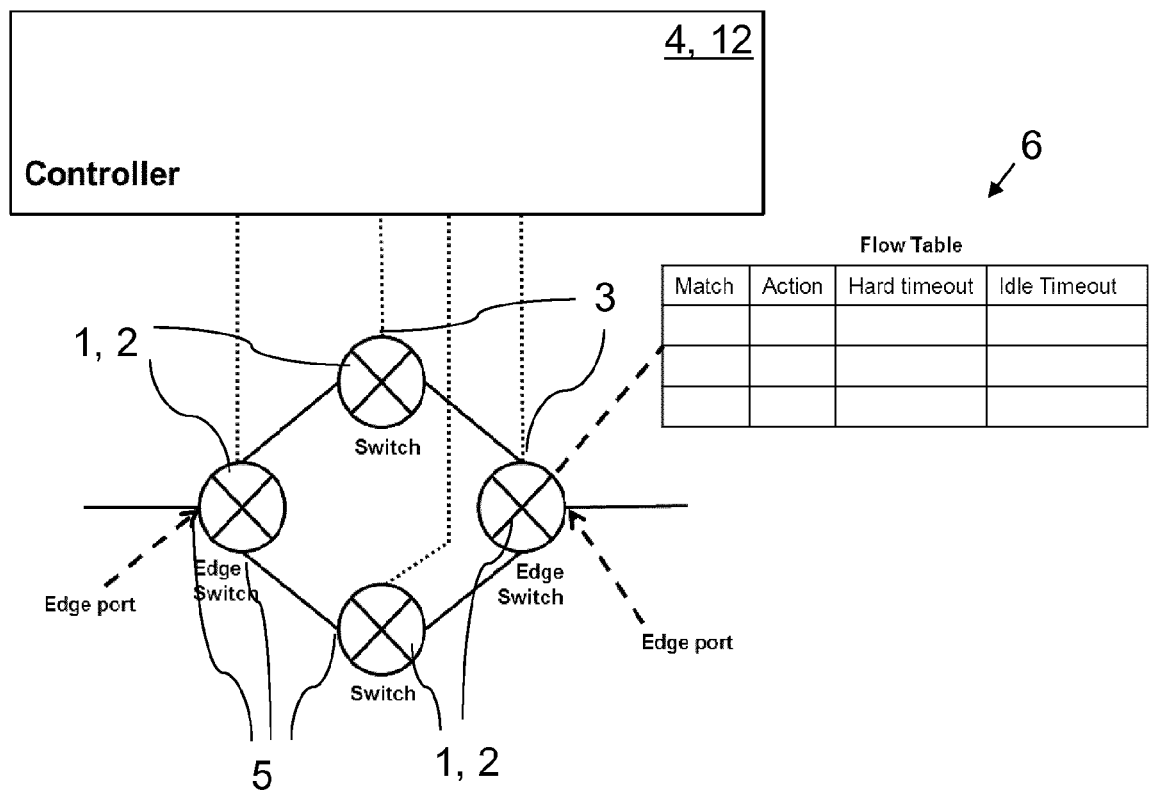
FIG. 1 is a schematic view illustrating a general network architecture in which embodiments of the present invention can be applied.

Embodiments of the present invention improve and further develop methods and systems for flow rule installation in a flow-based programmable network device in such a way that the forwarding solution scales to millions of data transmitting devices, e.g. IoT sensors, without overloading either the flow tables or the control plane.

Embodiments of the invention provide methods for flow rule installation in flow-based programmable network devices, wherein said flow-based programmable network devices comprise input/output ports, a flow table including forwarding rules that map packet flows from data transmitting devices in the network, received on an input port, to an output port based on a packet flow matching a rule in the forwarding rules, and a state table including state entries that specify states of the packet flows. Such methods include obtaining packet flow information that includes information about times and intervals of packet flow transmissions from said data transmitting devices, by a controller entity, programming forwarding rules into said flow table based on said packet flow information, and triggering activation of a forwarding rule programmed for a particular packet flow just-in-time before the actual transmission of said particular packet flow.

Embodiments of the invention further provide systems for flow rule installation, said systems comprising a flow-based programmable network device and a controller entity, wherein said flow-based programmable network device includes input/output ports, a flow table including forwarding rules that map packet flows from data transmitting devices in the network, received on an input port, to an output port based on a packet flow matching a rule in the forwarding rules, and a state table including state entries that specify states of the packet flows, and wherein said controller entity is configured to obtain packet flow information including information about times and intervals of packet flow transmissions from said data transmitting devices, to program forwarding rules into said flow table based on said packet flow information, and to trigger activation of a forwarding rule programmed for a particular packet flow just-in-time before the actual transmission of said particular packet flow.

According to embodiments of the invention, flow rule installation can be realized in a time-guarded fashion. Embodiments of the invention build on the definition of flow-based programmable network devices, for instance SDN switches, which allow stateful packet processing and which are programmable by a control entity, for instance an SDN controller, but without having to consult a controller each time. Especially, such switches can update their internal state (and thus trigger internal actions) based on absolute time. The idea behind embodiments of the invention is for switches to obtain knowledge about the time and interval with which each connected data transmitting device, e.g. sensor, generates traffic, and to use this information to autonomously "install" or "activate" flow rules that govern forwarding behavior for this sensor to the traffic sink (e.g. the IoT server). Instead of using reactive rule installation, which would cause control plane load, embodiments of the present invention enable just-in-time flow rule installation. Like in the reactive case, this approach allows distributing flow table entries over time (as described, for instance, in Dusi, M.; Bifulco, R.; Gringoli, F.; Schneider, F.: "Reactive logic in software-defined networking: Measuring flow-table requirements", in Wireless Communications and Mobile Computing Conference (IWCMC), 2014 International, vol., no., pp. 340-345, 4-8 Aug. 2014), but avoiding the controller interaction.

More specifically, according to embodiments of the invention the controller entity, which obtains knowledge about the time and interval of packet generation per each connected data transmitting device, will use this knowledge to program the time-triggered flow rule creation into the switches along the path that is computed for forwarding traffic between sensor and server. After such programming has happened once, switches can then activate (and deactivate) the relevant flow rules autonomously without controller interaction just-in-time before the actual sensor data packet transmission (or a respective request from the server to poll the data from the sensor). Here, "just-in-time" means that the forwarding of data from a sensor is enabled for a time window of configurable duration around the actual transmission. By providing such method or system that triggers timed or just-in-time creation or installation of forwarding flow rules in switches, without interactions with the respective controller, the number of fine grained traffic forwarding rules in the switches scales, i.e. flow table scalability is achieved.

To summarize, embodiments of the present invention allow just-in-time installation of flow rules which distributes flow entries over time, greatly increasing the scalability for a large number of devices that communicate only infrequently. This can be done without (much) interaction with the controller, i.e. either autonomously by the switches or via on-path signaling.

According to an embodiment of the invention the activation of a forwarding rule for a particular packet flow, i.e. a packet flow from a particular data transmitting device in the network, is triggered by means of a timely induced update of the state table with a new or changed state entry for the particular packet flow. According to an embodiment this new or changed state entry may be configured with a timeout that triggers its deletion after a certain time since its installation. In this way it is possible to opening a possible "transmission window" for a data transmitting device only for a small time band (of configurable length, depending on the implemented timeout value) around the actual time of packet flow transmission. This significantly improves the security of the network, since it becomes difficult for potential attackers to intercept or manipulate any sensor data. As an alternative to using timeouts, flow rules may be de-installed automatically by exploiting the fact that only a given (and known) number of consecutive packets (in most cases, likely only one) will be sent by an individual sensor, in which case the rule can be removed after the last packet has been forwarded.

According to an embodiment the flow-based programmable network device is provided with a time-trigger module which the controller entity programs to perform time-triggered flow rule creation. More specifically, state table updates may be performed by this time-trigger module implemented on the flow-based programmable network device's CPU. The time-trigger module may be configured to monitor the times of packet flow transmissions against a current clock value. Specifically, the time-trigger module may have an internal clock and may maintain (implemented in software) a list of deadlines corresponding to the times of packet transmissions per sensor, as reported and configured into the time-trigger module by the controller entity.

According to an embodiment state table updates may be performed by means of state transition actions contained in forwarding rules of the flow table. In this context, an external time source may be employed. For instance, this time source could be the controller entity itself or an IEEE1588/PTP (Precision Time Protocol) time source. The time source may send time-packets (containing a time value) that are delivered to the switch's fast path. Specifically, a state transition action for a particular packet flow may be triggered by sending a time-packet to the switch, wherein this time-packet carries a time value corresponding to the respective packet flow's transmission time and by configuring the forwarding rule in the flow table that contains the state transition action in such a way that it matches the time-packet.

According to an embodiment the time-packets generated by the external time-source may be sent as broadcast. Thus, the time-packets will eventually reach all the flow-based programmable network devices/switches (i.e. all switches on the path from the respective data transmitting device/sensor to the sink, e.g. IoT server) that can accordingly trigger the state changes.

According to an embodiment a state transition action for a particular packet flow may be triggered by relying on clock pulses that are implemented by sending clock-packets generated by an external clock source to the flow-based programmable network device. With respect to the implementation of the clock source it may be provided that an external clock source is either developed ad hoc, e.g., in the controller entity, or it can be provided leveraging legacy systems, such as a IEEE1588/PTP master time server, which sends periodic sync packets that may serve as clock pulses or ticks.

In using an external clock source as a reference source, forwarding rules in the flow table may be configured to match on the clock-packets and to update corresponding flow states to count the number of received clock-packets. Specifically, the clock pulses or ticks sent as broadcast from the clock source allows all switches to increase internal counters to emulate time with sufficient granularity in the absence of local timers.

According to embodiments of the invention, in order to enable the controller entity to obtain knowledge about the time and interval of packet generation per each data transmitting device, these devices may comprise an API (Application Programming Interface) from which the controlled entity can query the required information. In accordance with a main application scenario of the present invention the data transmitting devices may include sensors and/or smart meters, e.g. of a smart grid. Generally, obtaining knowledge about time and interval of packet transmissions of these devices could be achieved via static or manual configuration once a new device/sensor gets connected, or via machine learning approaches.

Embodiments of the present invention, as described hereinafter in detail, assume that the flow-based programmable network devices 1 (e.g. SDN switches 2) expose a control interface 3 that can be used to configure or program them. Without loss of generality it is assumed for simplicity that the devices 1 are controlled by a logically centralized controller entity 4 (e.g. SDN controller 12). However, as will be appreciated by those skilled in the art, the present invention would be applicable also in the case of network devices 1 controlled by different controllers, provided that these controllers are able to exchange messages among themselves. The controller 4 is connected to each of the devices (from here on interchangeably termed flow-based programmable network devices 1 or briefly switches 2) of the network using a control channel. A switch 2 has a set of ports 5 (input ports 5*a* and output ports 5*b*) that can be connected to other switches 2 or to end hosts, as exemplarily illustrated in FIG. 1, which illustrates a general concept of network architecture in which embodiments of the present invention can be applied. A port 5 connected to an end host is called "edge port". A switch that has one or more edge ports is called "edge switch".

A switch 2 further contains a flow table (FT) 6, as also shown in FIG. 1. The flow table 6 contains flow table entries (FTE). A FTE is composed of: a match part, which identifies network packets to which the FTE is applied by specifying the values of the packet's header fields; an action part, which specifies the action to be applied to the matched packets; an idle timeout that specifies the time after which the FTE has to be deleted if it did not match any packet. The set of FTEs in a switch's 2 FT 6 defines how the switch 2 forwards network packets. FTE's action can include the sending of packets to the controller 4 through the control channel. The transfer of a network packet from the switch 2 to the controller 4 is called "packet_in" in the context of the present invention. The packet_in contains the following information: the network packet that generated it, the switch identifier from which it is sent and the identifier of switch's 2 input port 5*a* on which the packet was received. The switch 2 can be configured to notify the controller 4 whenever a FTE gets deleted.

Figure 2:
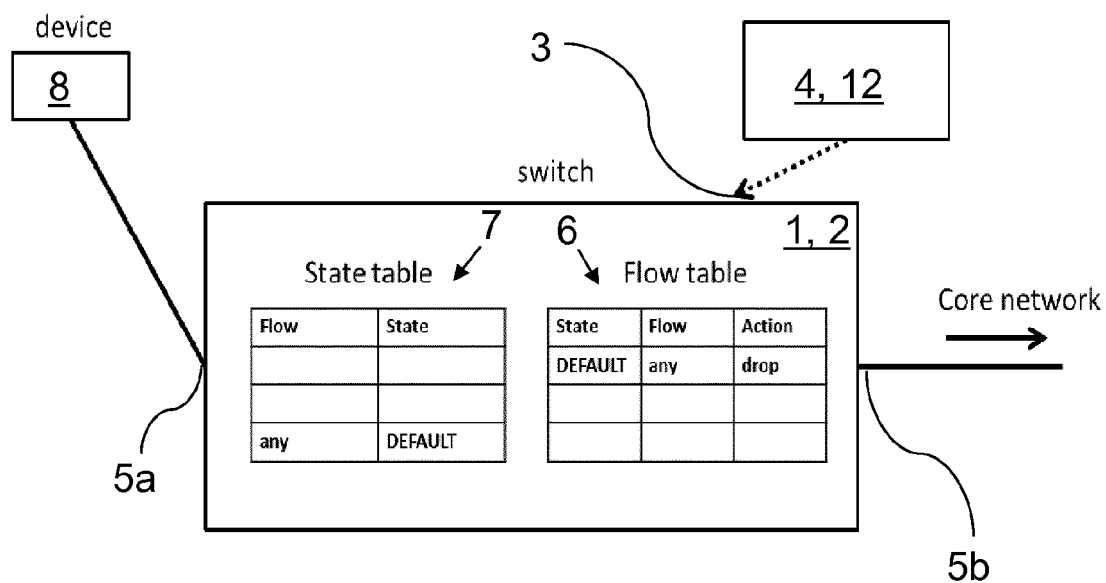
FIG. 2 is a schematic view illustrating a network switch that contains a state table and a flow table in accordance with embodiments of the present invention.

Additionally, switches 2 may have a state table 7, as illustrated in FIG. 2. A state table entry specifies the state for a given network flow. When a packet, e.g. generated by a data transmitting device 8 in the network (for instance a sensor or a smart meter) enters a switch 2, if it is matched by one of the entries in the state table 7, it is enriched by metadata that carries such state information within the switch 2. The FTEs may also match on this state information. Furthermore, a FTE's action may also include a set_state action for a given flow. Such set_state action modifies the state information contained in the state table 7, for a given state table's entry. Thus, the flow table 6 can be used for the implementation of state transitions for a given flow, upon reception of a network packet. Both the state table entries and FTEs are associated with both idle and hard timeouts. Further details with respect to additional or similar characteristics/capabilities of this kind of switch can be obtained from Giuseppe Bianchi et al.: "OpenState: Programming Platform-independent Stateful OpenFlow Applications inside the Switch", *SIGCOW Comput. Commun. Rev.* 44, 2 (April 2014), 44-51.

In connection with the following description of embodiments of the present invention a SDN network will be assumed, e.g., one based on the OpenFlow technology, as the network to which the described embodiments apply. In fact, a SDN network provides all the aforementioned properties. However, as will be appreciated by those skilled in the art the present invention is applicable to any other network that provides such properties. Furthermore, the terms flow rule, forwarding rule and FTE will be sometimes used interchangeably hereinafter.

Figure 3:
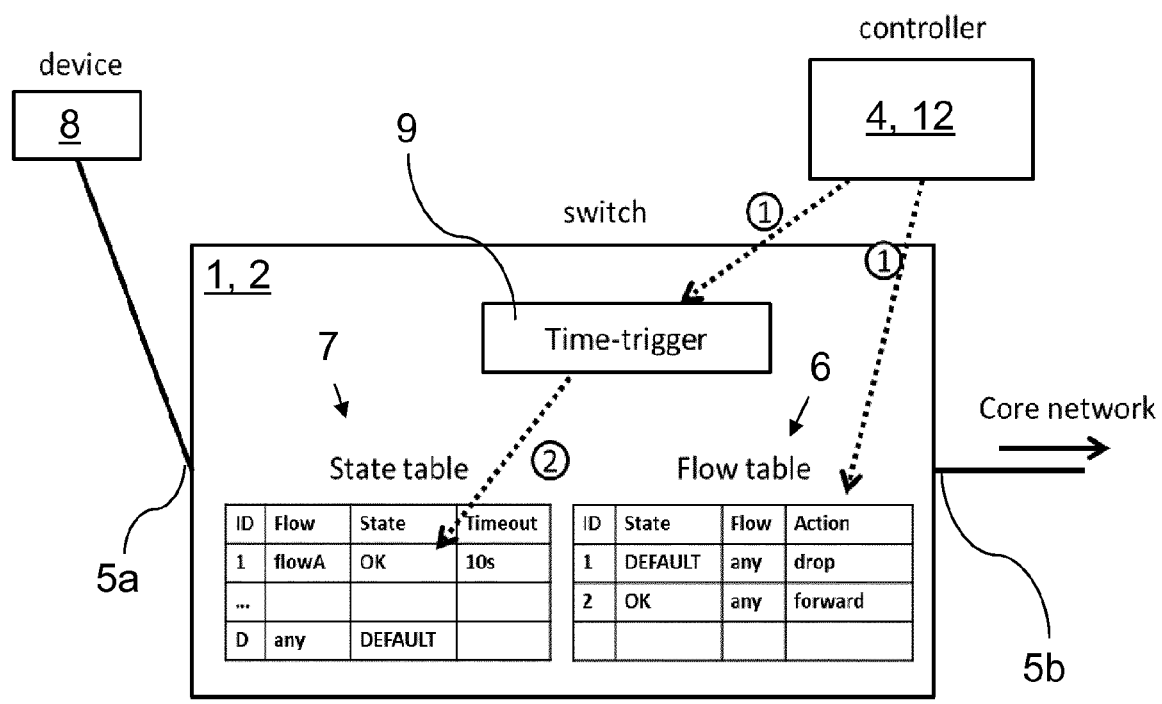
FIG. 3 is a schematic view illustrating a network switch that contains a time-trigger module in accordance with embodiments of the present invention.

Turning now to FIG. 3, this figure illustrates an embodiment of the present invention according to which time-guarded flow rule installation is performed by using a time-trigger module 9 implemented on top of the switch's 2 CPU. The controller 4 configures the switch's 2 flow table 6 and the time-trigger module 9 at a certain time, denoted '1'. In the illustrated embodiment the controller 4 programs the switch's 2 flow table 6 by configuring a first forwarding rule (FTE with ID 1) that specifies that any flows having the state DEFAULT will be dropped, and a second forwarding rule (FTE with ID 2) that specifies that any flows having the state OK will be forwarded.

The switch's 2 state table 6 initially contains only a single entry (with ID D) that assigns any incoming packet flow the state DEFAULT. Consequently, under these conditions any incoming packet flow will be processed by the flow table's FTE ID 1, i.e. it will be dropped. However, at a time '2', when the time-trigger module 9 executes the controller 4 programmed operation, the state table 7 is updated with a new state entry (with ID 1). The new state entry added by the time-trigger module 9 enables the flowA (which is assumed to be transmitted by the illustrated sensor 8) at being forwarded, since the entry associates it with the state OK, i.e. flowA will be processed by the flow table's FTE ID 2, i.e. it will be forwarded. The state entry 1 is associated also with a hard timeout, which triggers its deletion after a fixed time since its installation.

One of the possible implementation options for the time-trigger module in accordance with embodiments of the present invention is to use timers. That is, the time trigger module 9 has an internal clock and maintains a list of deadlines that correspond to the scheduled packet flow transmission times of the sensors 8 involved. The internal clock is monitored to verify the approaching of such deadline event. Each deadline is associated with a time value that tells if the deadline is passed, by confrontation with the current clock value. When a given deadline is passed, a corresponding event is generated. For instance, in the context of the embodiment of FIG. 3, when the scheduled transmission time for flowA is approaching (according to the information programmed into the time trigger module 9 by the controller 4), the time-trigger module 9 updates the state table 7 by introducing a respective entry (entry with ID 1 in FIG. 3) that performs a state transition for flowA in order to enable forwarding of flowA. After a timeout of 10 s the state entry is deleted and the 'forwarding window' is closed, which means that any data transmitted from the sensor 8 will not be forwarded anymore.

Usually, these implementations rely on the switch's 2 CPU. In fact a switch 2 is usually composed of a fast path implemented in a dedicated ASIC (Application Specific Integrated Circuit), and of a slow path, implemented on top of a CPU. When the number of deadlines to monitor is high, that is, when the number of configured events is high, the switch's 2 CPU may become overloaded. Since maintaining track of a lot of timed events in switches 2 consumes considerable CPU resources, especially in aggregation switches 2 aggregating a large share of peripheral sensors 8, optimizations will be described hereinafter in accordance with two further embodiments of the present invention. Both optimizations rely on the presence of an external time-trigger, and guarantee the complete execution in the switch's 2 fast path (i.e. without burdening the switch's 2 CPU).

Figure 4:
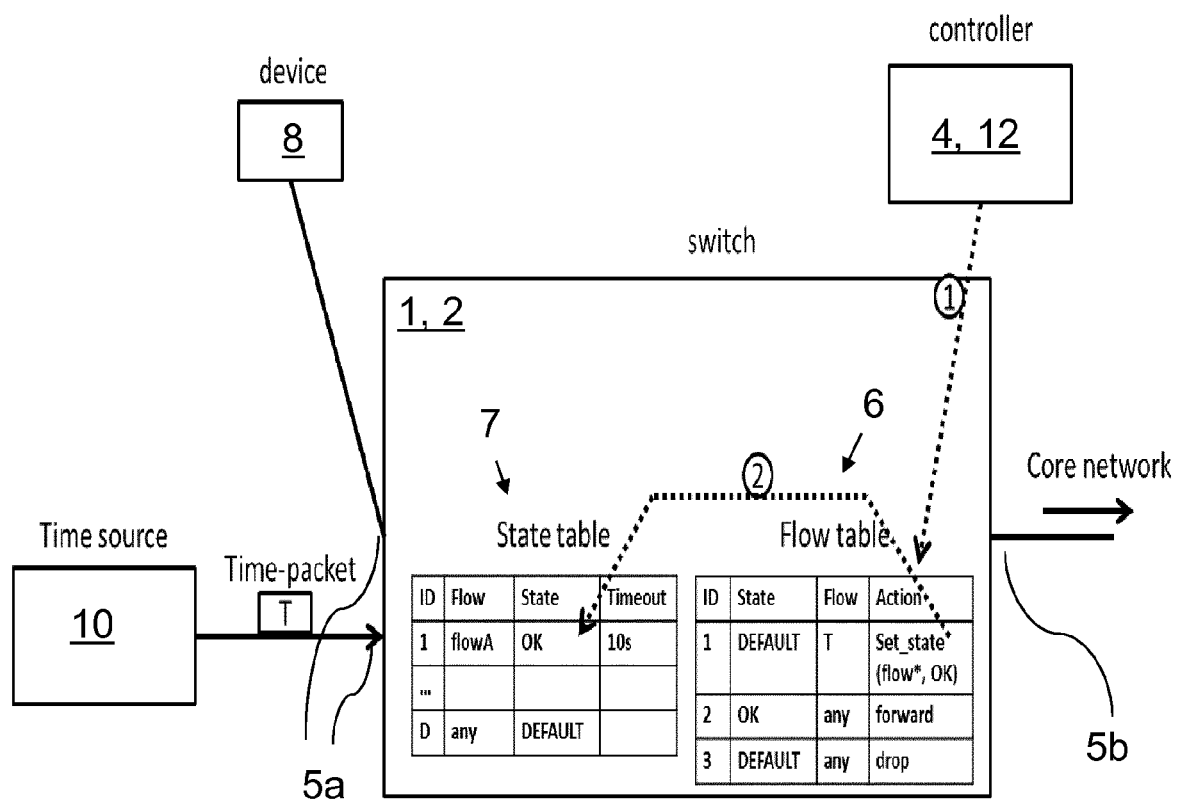
FIG. 4 is a schematic view illustrating a network switch with external time source optimization in accordance with embodiments of the present invention.

The first optimization, which is illustrated in FIG. 4, relies on an external time source 10 that sends a data packet on the network. This data packet is a time-packet, denoted T, containing a time value the switch 2 can read from the time-packet. The time source 10 could be the controller 4 itself or an IEEE1588/PTP (Precision Time Protocol), or any other suitable time source. The time-packet, being delivered to the switch's 2 fast path, is handled by the switch's 2 fast path only.

The triggering of an event (i.e., because a deadline for the transmission of the data from a network device 8, e.g. a sensor, has passed), can be implemented by means of FTEs. That is, a FTE matches the time-packet T, which is sent by the time source 10 when a specific flow rule has to be enabled at the switch 2, and is configured with a set_action state that changes the state for a subset of the entries in the state table 7 (e.g., those entries related to the devices 8 whose communication has to be enabled). Specifically, according to the illustrated embodiment, the time-packet T received at an input port 5a of the switch 2 gets assigned the state DEFAULT by the state table entry with ID D. When this time-packet T is processed by the switch's 2 flow table 6, it matches FTE ID1, which sets the state entry for a number of flows, e.g., flowA, i.e. it causes a state transition for flowA to state OK. Consequently, flowA matches FTE ID2 and will thus be forwarded. The state entry will disappear after the 10 s timeout will expire.

For this solution to work at scale, an option is to send the time-packet as broadcast, so it will eventually reach all the switches that can accordingly trigger the state changes. Also, the network should guarantee the real time delivery of the time-packet. This can be achieved by enforcing proper QoS mechanisms in the network.

Figure 5:
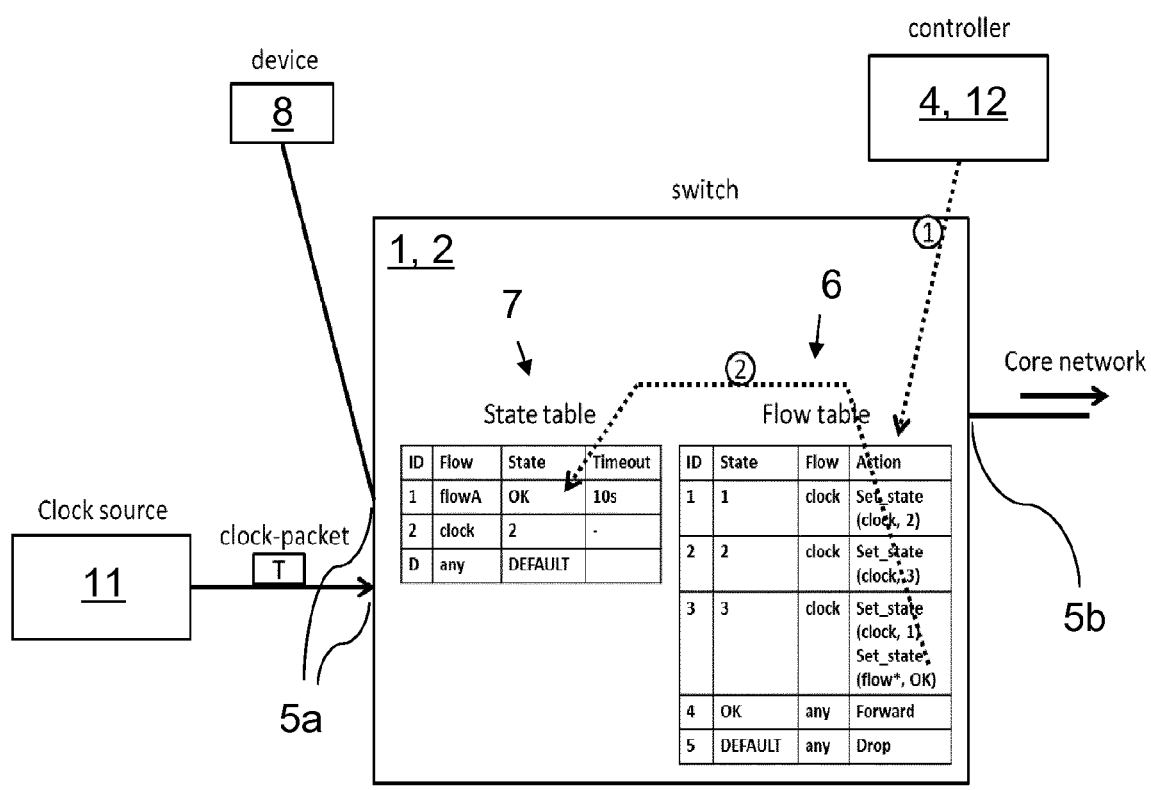
FIG. 5 is a schematic view illustrating a network switch with external clock source optimization in accordance with embodiments of the present invention.

An embodiment in accordance with a second optimization is illustrated in FIG. 5. Specifically, this second optimization relies on an external clock source 11 somewhere in the network that is used as a reference clock that broadcasts reference clock pulses ("clock ticks") in the data plane of the network, i.e. receivable by all network switches 2. If these clock ticks come in regular and known intervals, switches 2 do not need to maintain CPU-intensive timers (like in the embodiment of FIG. 3), but can rather increment simple internal counters to mimic clock advancement on the given granularity. As a matter of course, the granularity has to be fine enough to capture the timing requirements arising from the combination of all the connected sensors 8. However, it should be noted that different kind of clock pulses can be combined with each other, for instance clock pulses $T_1$ emitted every hour and clock pulses $T_2$ emitted every minute, in order to construct a finely graduated mimic that can manage and adapt to the individual data transmission characteristics of different sensors 8.

In the embodiment of FIG. 5, the controller 4 first programs the switch's 2 flow table 6 (as shown at '1') by configuring a number of state transitions to establish a counter of clock ticks that are implemented by means of the clock-packets. The flow table's 6 FTEs match on the clock packet and update the corresponding flow state to count the number of received clock packets. Specifically, a clock packet having state 1 matches FTE ID 1 and causes the state of the state entry for the flow of clock packets (i.e. state entry ID2) to make a transition to state 2. Consequently, the next clock packet received by the switch 2 will get assigned state 2 (since it matches state table entry ID2). Hence, in the flow table 6 this clock packet will match FTE ID2, which again induces a state transition for the clock packets (i.e. from 2 to 3). One of the FTEs, in FIG. 5 the one that resets the counter, i.e. FTE ID3, sets the state entry for a number of flows, e.g., flowA. Therefore, assuming the clock pulses are transmitted hourly, the data transmitting device 8 in the network to which flowA belongs will be enabled to transmit its data every three hours. The state entry will disappear after the 10 s timeout will expire, i.e. due to the implemented timeout the "transmission window" will be opened only for a duration of 10 s.

It should be noted that in the embodiment described above each switch 2 in the network has its own clock counter, thus, a general clock source 11 may serve all the switches 2 in the network, and each switch 2 can change the entries of the state table 7 at different times.

Besides scalability and low-overhead advantages, the embodiments described above have security-related advantages as well. First, by having flow rules "alive" only for a very small time band around the actual data transmission, it becomes difficult for attackers in the network to hack into sensors 8 or get their hands on the sensor data. Outside of the time band packets destined for the sensor 8 cannot be forwarded, the sensor 8 is basically invisible. Second, the time-guarded installation of flow rules basically limits traffic generation and forwarding opportunities for attached sensors 8. In a context such as Smart Cities, there will be many sensors 8 from very heterogeneous sources. Still, sensors 8 which are expected (according to data sheet or whatever source of information) to produce data only once per time period, will not succeed at pushing data through the network more often than that, because the ingress switch 2 will not have corresponding flow rules outside of the pre-configured time band.

Finally, it should be noted that on-demand access of sensor data from the IoT server (instead of access at fixed-intervals) is also possible in the context of the present invention. In that case, however, the ingress switch 2 needs to use the reactive mode to ask the controller 4 for a corresponding flow rule.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 flow-based programmable device
2 SDN switch
3 control interface
4 controller entity
5 port
6 flow table
7 state table
8 data transmitting device/sensor
9 time-trigger module
10 external time source
11 external clock source
12 SDN controller

The invention claimed is:

1. A method for flow rule installation in a flow-based programmable network device, wherein the flow-based programmable network device comprises input/output ports, a flow table including forwarding rules that map packet flows from data transmitting devices in the network, received on an input port, to an output port based on a packet flow matching a rule in the forwarding rules, and a state table including state entries that specify states of the packet flows, the method comprising:
    obtaining packet flow information that includes information about times and intervals of packet flow transmissions from the data transmitting devices,
    programming, by a controller entity, forwarding rules into the flow table based on the packet flow information,
    triggering activation of a forwarding rule programmed for a particular packet flow just-in-time before actual transmission of the particular packet flow, and
    performing state table updates by state transition actions contained in forwarding rules of the flow table, and
    wherein a state transition action for a particular packet flow is triggered by sending, to the flow-based programmable network device, a time-packet generated by an external time source, the time-packet carrying a time value corresponding to a transmission time of the particular packet flow, and by configuring the forwarding rule in the flow table that contains the state transition action in such a way that it matches the time-packet.

2. The method according to claim 1, wherein the activation of a forwarding rule for a particular packet flow is triggered by a timely induced update of the state table with a new or changed state entry for the particular packet flow.

3. The method according to claim 2, wherein the new or changed state entry is configured with a timeout that triggers deletion of the new or changed state entry after a certain time since installation of the new or changed state entry.

4. The method according to claim 1, wherein the state table updates are performed by a time-trigger module implemented on a CPU of the flow-based programmable network device.

5. The method according to claim 4, wherein the time-trigger module monitors times of packet flow transmissions against a current clock value.

6. The method according to claim 1, wherein the time-packets generated by the external time-source are sent as a broadcast.

7. A system for flow rule installation, the system comprising:
    a flow-based programmable network device; and
    a controller entity,
    wherein the flow-based programmable network device includes:
        input/output ports,
        a flow table including forwarding rules that map packet flows from data transmitting devices in the network, received on an input port, to an output port based on a packet flow matching a rule in a set of forwarding rules,
        a CPU on top of which a time-trigger module is implemented, and
        a state table including state entries that specify states of packet flows, and
    wherein the controller entity is configured to:
        obtain packet flow information including information about times and intervals of packet flow transmissions from the data transmitting devices,
        program forwarding rules into the flow table based on the packet flow information, and
        trigger activation of a forwarding rule programmed for a particular packet flow just-in-time before an actual transmission of the particular packet flow, and
    wherein the time-trigger module is configured to perform state table updates by state transition actions contained in forwarding rules of the flow table, and
    wherein a state transition action for a particular packet flow is triggered by sending, to the flow-based programmable network device, a time-packet generated by an external time source, the time-packet carrying a time value corresponding to a transmission time of the particular packet flow, and by configuring the forwarding rule in the flow table that contains the state transition action in such a way that it matches the time-packet.

8. The system according to claim 7, wherein the data transmitting devices comprise an API from which the controller entity can query times and intervals of packet flow transmissions from the data transmitting devices.

9. The system according to claim 7, wherein the data transmitting devices include sensors and/or smart meters of a smart grid.

10. A flow-based programmable network device configured to be employed in the system according to claim 7.

11. A controller entity configured to be employed in the system according to claim 7.

12. A method for flow rule installation in a flow-based programmable network device, wherein the flow-based programmable network device comprises input/output ports, a flow table including forwarding rules that map packet flows from data transmitting devices in the network, received on an input port, to an output port based on a packet flow matching a rule in the forwarding rules, and a state table including state entries that specify states of the packet flows, the method comprising:
obtaining packet flow information that includes information about times and intervals of packet flow transmissions from the data transmitting devices,
programming, by a controller entity, forwarding rules into the flow table based on the packet flow information,
triggering activation of a forwarding rule programmed for a particular packet flow just-in-time before actual transmission of the particular packet flow, and
triggering a state transition action for a particular packet flow by relying on clock pulses that are implemented by sending clock-packets generated by an external clock source to the flow-based programmable network device.

13. The method according to claim 12, wherein forwarding rules in the flow table are configured to match on the clock-packets and to update corresponding flow states to count a number of received clock-packets.

14. The method according to claim 12, wherein the activation of a forwarding rule for a particular packet flow is triggered by a timely induced update of the state table with a new or changed state entry for the particular packet flow.

15. The method according to claim 14, wherein the new or changed state entry is configured with a timeout that triggers deletion of the new or changed state entry after a certain time since installation of the new or changed state entry.

16. The method according to claim 12, wherein the state table updates are performed by a time-trigger module implemented on a CPU of the flow-based programmable network device.

17. The method according to claim 16, wherein the time-trigger module monitors times of packet flow transmissions against a current clock value.

\* \* \* \* \*